Feb. 17, 1931.　　　J. J. GREENE　　　1,793,315
METER CONTROLLED TORQUE DEVICE
Filed July 22, 1929
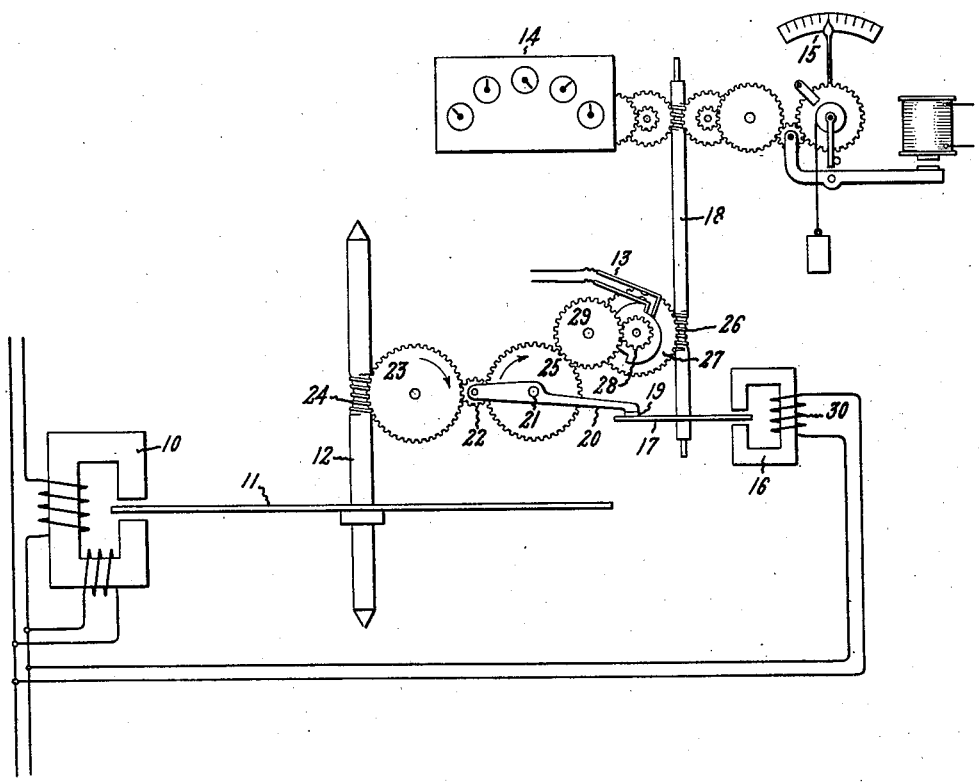
Inventor:
James J. Greene,
by Charles E. Tullar
His Attorney Patented Feb. 17, 1931

1,793,315

UNITED STATES PATENT OFFICE

JAMES J. GREENE, OF LIBERTY, NEW YORK, ASSIGNOR TO GENERAL ELECTRIC COMPANY, A CORPORATION OF NEW YORK

METER-CONTROLLED TORQUE DEVICE

Application filed July 22, 1929. Serial No. 379,952.

My invention relates to torque amplifying apparatus and its principal object is to provide a motor controlled in response to the rate of rotation of a meter for driving or operating other devices at a rate proportional to the meter rate. Integrating meters are often used to operate contact devices, demand mechanisms, recorders and the like. Occasionally the energy necessary to operate the contact or other device is in excess of that possible to obtain from the meter without causing its erroneous opertion. My invention is useful in such cases to relieve the meter of the excessive load. In the preferred form of my invention I provide a small electric motor for driving the contact or other device and the rate of rotation of this motor is accurately controlled in accordance with the meter rate without imposing any load on the meter.

The features of my invention which are believed to be novel and patentable will be pointed out in the claims appended hereto. For a better understanding of my invention reference is made in the following description to the accompanying drawing which illustrates the preferred form of my invention as applied between an integrating electric meter and other devices which are to be actuated in accordance with the rate of rotation of the meter.

In the drawing the meter is represented simply as a stationary driving magnet system 10 and a rotating disc 11 secured to a shaft 12. It will be understood that so far as my invention is concerned the meter may be of any suitable type or may comprise any other rotational device or shaft the rotational movement of which it is desired to amplify. In the illustration I have represented a rotational contact device 13, a register 14 and a demand meter 15 which are to be actuated in accordance with the rate of operation of meter shaft 12 and it will be understood that the nature of the actuated device or devices is immaterial so far as my invention is concerned. Ordinarily gearing is provided between the meter shaft and actuated devices so that the energy for driving such devices is taken directly from the meter. As is well known, a meter cannot be used for driving such devices when any appreciable amount of energy is required except by sacrificing meter accuracy, or by providing a meter of special and uneconomical design.

Instead of providing a direct mechanical drive between the meter and such other device or devices as are represented at 13, 14 and 15, I provide a small motor 16 for driving these devices and I control the motor so that its rate of operation is proportional to that of the meter. In the illustration I have shown a constantly energized induction disc motor having a stationary field member 16, a rotational disc 17 which is secured on the shaft 18, and the devices 13, 14 and 15 are suitably geared to and are driven by this auxiliary torque motor. Such a motor has a torque characteristic which varies inversely with speed.

In order to make the motor rate proportional to the meter rate I provide a motor controlling device such as a brake 19 cooperating with motor disc 17 and controlled by the differential movement of the motor and meter.

The brake pad 19 is secured at one end of an arm 20 which is pivoted at 21 and carries a gear wheel 22 at its opposite end. Gear wheel 22 is in mesh with a gear 23 driven from the variable speed meter shaft 12 through an irreversible worm gear drive 24 in the direction indicated by the arrow. Worm gear 24 does not necessarily mesh with gear 23 since separate gears mounted on the same shaft may be employed between the worm 24 and the gear 22. Gear wheel 22 is also in mesh opposite wheel 23 with a gear 25 driven from motor shaft 18, through worm 26 and gears 27, 28 and 29, gear 25 being driven in the direction indicated by the arrow thereon. The three gears 23, 22 and 25 are in the same plane. Since gear 22, which we may term the differential gear, is free to move bodily around pivot 21 and about its own axis, it will take a position depending on the differential movement of wheels 25 and 23 or upon the differential movement of the motor shaft 18 and meter shaft 12. This movement is limited in one direction when the brake pad 19 comes against the motor disc 17.

In the operation of this device the motor 16 will be constantly energized and will be capable of driving the devices 13, 14 and 15 at the maximum desired rate when not braked at 19. However the motor speed is held down to a rate proportional to the meter rate by the application of the brake. Assuming the meter is not running, the brake will be applied until the motor disc 17 cannot rotate. When the meter starts to rotate its first action will be to carry wheel 22 downwardly partially releasing the brake until motor disc 17 starts and runs at a proportional rate. Wheels 23 and 25 will then rotate at the same speed assuming they are the same size and the brake arm will remain stationary, placing just enough pressure on the brake pad to maintain this condition. At a higher meter speed the brake will be lifted slightly to allow the motor to run at a correspondingly higher speed. Any departure of the motor speed from the desired rate will cause a new adjustment of the brake to correct the motor speed. The brake pressure is maintained inversely proportional to the meter speed. Thus the motor supplies all the energy for driving the devices 13, 14 and 15, while the differentially operated brake controls the speed of the motor and maintains it proportional to the meter speed. The meter serves as a variable speed escapement for the motor and is relieved of the energy necessary to drive the devices 13, 14 and 15. The energizing coil 30 of the motor will preferably be connected to the same source as that to which the electric meter is connected so that in case of a failure in the source of supply both the meter and motor will start and stop together. By suitably proportioning the parts, the brake pressure and motor torque, I am able to entirely relieve the meter of the extra load and obtain smooth and satisfactory operation.

It will be evident that the details of construction and arrangement of parts may be considerably modified from that shown in the drawing without departing from the principle of operation described, and the appended claims are intended to cover all modifications and arrangements coming fairly within the true spirit and scope of my invention.

What I claim as new and desire to secure by Letters Patent of the United States, is:—

1. In combination, a variable speed shaft, a second shaft, a constantly energized induction disc electric motor for driving said second shaft, a friction brake for said motor capable of stopping said motor and controlling its speed, a pivoted brake arm for said brake and a differential gear connected between said two shafts and mounted on said brake arm for controlling the application of said brake to maintain the speed of the motor proportional to that of the variable speed shaft.

2. In combination, an integrating meter, a rotational device to be actuated in accordance with the rate of operation of said meter, a motor for and capable of actuating said device at the maximum desired rate, a friction brake for said motor capable of controlling the speed of said motor from said maximum rate down to standstill, and means differentially comparing the speeds of rotation of said meter and said motor for controlling said brake so as to cause the rotational device to be actuated at a rate proportional to the meter rate.

3. In combination, an integrating meter, a rotational device to be actuated in accordance with the rate of operation of said meter, a constantly energized electric motor for actuating said device in proportion to the rate of the meter, a mechanical differential connected between the meter and motor for comparing their relative speeds, said differential having a part movable in opposite directions in accordance with plus and minus departures from the desired motor speed, and a friction brake for said motor actuated by the movable part of the differential so as to limit the motor speed to the desired rate.

4. In combination, a variable speed shaft, a second shaft to be driven at a speed proportional to the variable speed shaft, a constantly energized motor having a torque characteristic varying inversely with speed for driving the second shaft, a pair of gear wheels arranged in the same plane and rotated in opposite directions by said respective shafts, an arm pivoted on the axis of rotation of one of said wheels, a brake pad on said arm in engagement with some portion of the rotating system driven by the motor, a differential gear carried by said arm located between and in engagement with the oppositely rotating gears, said differential gear, arm and brake pad serving to brake the motor in inverse proportion to the speed of the variable speed shaft.

5. In combination, an integrating meter, a rotational device to be driven at a rate proportional to that of the meter, a motor for driving said device, means for controlling the speed of said motor, a mechanical differential between said meter and motor having a movable part for actuating the speed controlling means of the motor so as to maintain its speed proportional to that of the meter, said mechanical differential being connected to the meter through an irreversible worm gear drive.

In witness whereof, I have hereunto set my hand this 16th day of July, 1929.

JAMES J. GREENE.